United States Patent [19]

Hoff, Jr. et al.

[11] 4,319,325

[45] Mar. 9, 1982

[54] DIGITAL PROCESSOR FOR PROCESSING ANALOG SIGNALS

[75] Inventors: Marcian E. Hoff, Jr.; Marshall A. Townsend; Stephen F. Dreyer, all of Sunnyvale, Calif.

[73] Assignee: Intel Corporation, Santa Clara, Calif.

[21] Appl. No.: 120,701

[22] Filed: Feb. 11, 1980

Related U.S. Application Data

[63] Continuation-in-part of Ser. No. 85,247, Oct. 16, 1979, abandoned, which is a continuation of Ser. No. 927,029, Jul. 24, 1978, abandoned.

[51] Int. Cl.³ .......................... G06F 7/48; G06F 7/52
[52] U.S. Cl. .................................. 364/200; 364/715
[58] Field of Search .............. 364/715, 724, 736, 755, 364/759, 200 MS File, 900 MS File

[56] References Cited

U.S. PATENT DOCUMENTS

| 3,571,803 | 3/1971 | Huttenhoff | 364/715 |
|---|---|---|---|
| 3,631,230 | 12/1971 | Chen | 364/715 |
| 3,700,874 | 10/1972 | Heightley | 364/736 |
| 3,714,402 | 1/1973 | Baumwolspiner | 364/724 |
| 3,725,687 | 4/1973 | Heightley | 364/759 |
| 3,768,077 | 10/1973 | Nier et al. | 364/900 |
| 3,996,566 | 12/1976 | Moran | 364/200 |
| 4,086,474 | 4/1978 | Negi et al. | 364/757 |
| 4,099,245 | 7/1978 | Maysonett | 364/724 |
| 4,104,729 | 8/1978 | Gingell | 364/757 |
| 4,117,541 | 9/1978 | Ali | 364/724 |

OTHER PUBLICATIONS

Abraham Peled, "A Digital Signal Processing System" in *IEEE ICASSP,* Apr. 1976, Philadelphia, Pa., pp. 636–639.

Morris and Mudge, "Speed Enhancement of Digital Signal Processing Software Via Microprogramming A General Purpose Minicomputer", Session 5, Paper No. 5 in *IEEE ICASSP,* 1977.

*Primary Examiner*—Gareth D. Shaw
*Assistant Examiner*—Eddie P. Chan
*Attorney, Agent, or Firm*—Blakely, Sokoloff, Taylor & Zafman

[57] ABSTRACT

An integrated circuit processor real time processing of analog signals is described. The programmable processor duplicates filters, waveform generators and non-linear functions, such as rectification, with a high degree of stability and at a relatively low cost. A two-port, random-access memory provides inputs to an arithmetic logic unit (ALU). One of these inputs is coupled through a scaler (shifter). This scaler in conjunction with the ALU provides efficient multiplication, particularly by coefficients. ALU overflows are handled in an unusual manner to eliminate additional processing time for overflows. In a typical application, the one chip processor, with its 192-word program, samples an input analog signal at the rate of 13,020 Hz and detects the 8 tones used in telephony.

14 Claims, 7 Drawing Figures

$$y_0 = gx + B_1 y_1 + B_2 y_2$$

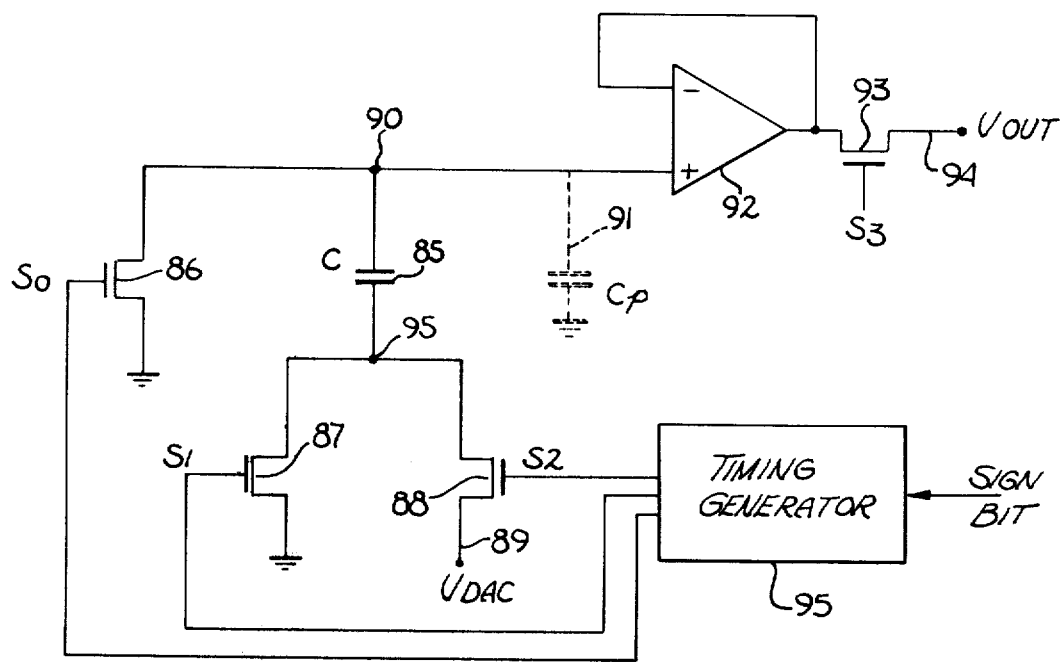
Fig. 5
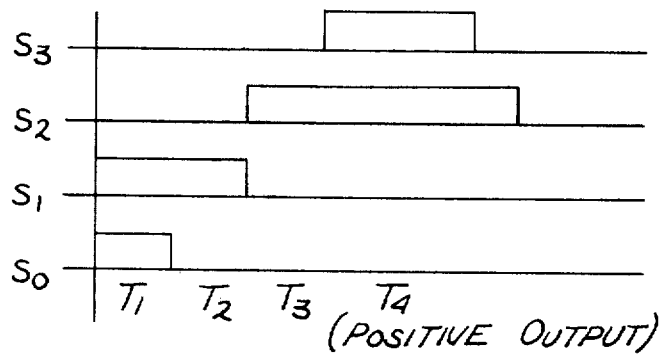
Fig. 6a (POSITIVE OUTPUT)
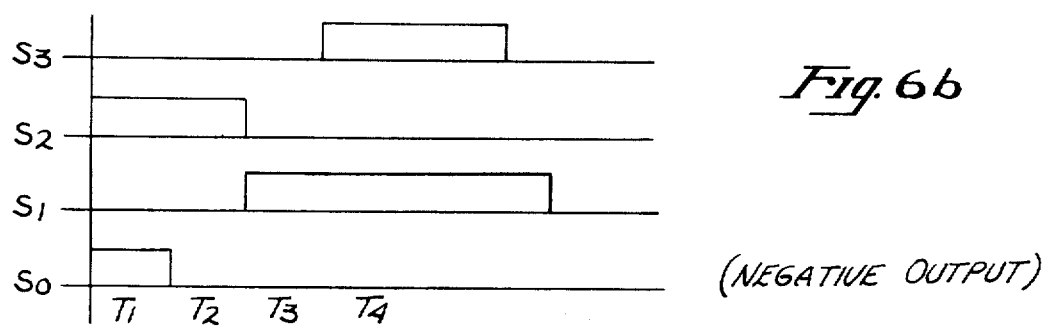
Fig. 6b (NEGATIVE OUTPUT)

DIGITAL PROCESSOR FOR PROCESSING ANALOG SIGNALS

This is a continuation-in-part of Ser. No. 085,247, filed on Oct. 16, 1979, now abandoned, which was a continuation application of Ser. No. 927,029, filed July 24, 1978, now abandoned.

BACKGROUND OF THE INVENTION

1. Field of the Invention

The invention relates to the field of digital processors, particularly those structured for processing analog signals.

2. Prior Art

Much of the current commercial LSI technology is directed towards the processing and handling of digital signals. Recently, with the declining cost of integrated circuits and their improved performance, more emphasis is being placed on the digital processing of analog signals. Digital(LSI)processing of video, speech and other analog signals has become more common.

The efficient processing of these analog signals has required new architectures. In the case of the present invention, a two-port, random access memory and the unique treatment of overflows provide an extremely efficient processor. The closest processors known to applicant are described in *IEEE ICASSP* April 21-14, 1976, Philadelphia, PA., "A Digital Signal Processing System" by Abraham Peled, pages 636–639, and *IEEE ICASSP*, 1977, "Speed Enhancement of Digital Signal Processing Software Via Microprogramming A General Purpose Minicomputer" by Morris and Mudge, Session 5, Paper, No. 5.

SUMMARY OF THE INVENTION

A digital processor for processing analog signals is described. The processor includes an arithmetic logic unit (ALU) for performing digital arithmetic. A random-access memory which has first and second output ports is coupled to the ALU through its first output ports. The data in the memory may be simultaneously coupled to either the first or second ports. The second output ports of the memory are coupled to the ALU through a scaler means which is used for shifting the digital output of the memory. The output of the ALU is coupled to the input of the memory. A program storage means is employed for storing a digital program which controls the operation of the ALU, memory and scaler. Filtering and other functions are readily performed by the processor.

BRIEF DESCRIPTION OF THE DRAWINGS

FIG. 5 is a circuit diagram of an output circuit used with the described processor; and FIGS. 6a and 6b are diagrams of timing signals used with the buffer of FIG. 5.

DETAILED DESCRIPTION OF THE INVENTION

A digital processor particularly suited for processing analog signals is described. The processor duplicates filters, waveform generators and non-linear functions, such as rectification. In the following description, numerous specific details, such as specific word lengths, cycle times, etc., are set forth to provide a thorough understanding of the invented processor. However, it will be obvious to one skilled in the art that the invention may be practiced without the use of these specific details. In other instances, well-known circuits are shown in block diagram form in order not to obscure the present invention in unnecessary detail.

Other details of the invented processor are described in "An Analog Input/Output Microprocessor", a paper delivered at the *IEEE International Solid State Circuit Conference*, Feb. 19, 1979 by Hoff and Townsend and "Single-Chip n-MOS Microcomputer Processes Signals in Real Time", *Electronics*, March, 1979, Page 105, by Hoff and Townsend.

Figure 1:
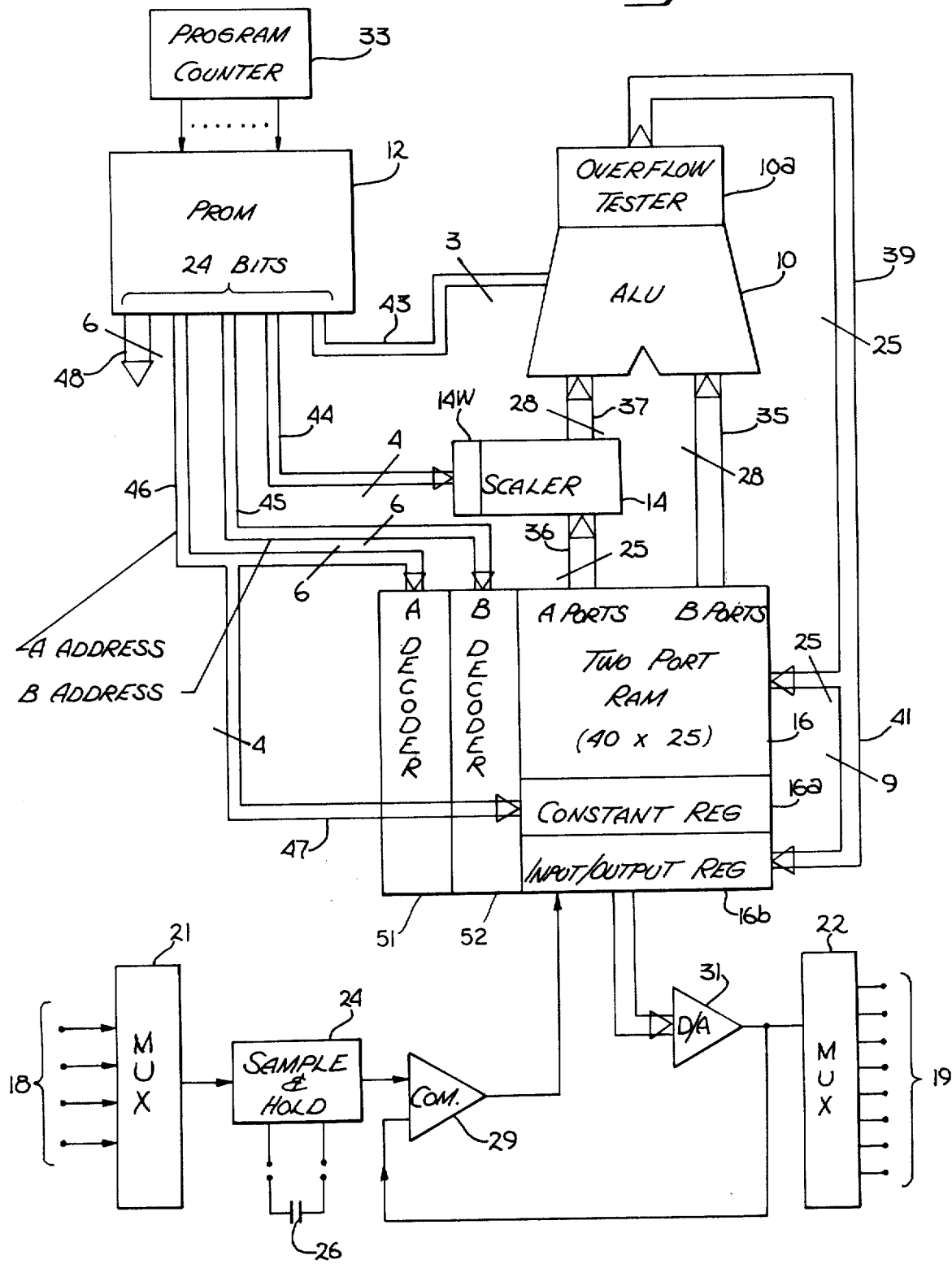
FIG. 1 is a block diagram of the presently preferred embodiment of the invented processor.

In the presently preferred embodiment, the entire processor, shown in block diagram form in FIG. 1, is fabricated on a single silicon substrate employing metal-oxide-semiconductor (MOS) technology. The circuit is realized with n-channel, field-effect transistors employing polycrystalline silicon gates. The programmable read-only memory (PROM) which stores the processors's program uses floating gate memory device, specifically cells with double polycrystalline silicon gates. The cells are erased by exposure to ultraviolet radiation. It will be obvious to one skilled in the art that other integrated circuit technologies may be employed for the fabrication of the processor.

As presently realized, the processor employs an external capacitor 26 for use with the sample-and-hold means 24. While an externally generated clocking signal may be employed, the processor also includes clock generation circuitry which only requires the placement of an external crystal between designated pins. Other inputs to the procesor are the $\pm 5$ volt power supply potentials and a $\pm 25$ volt potential used for the PROM programming.

The master clock is divided into multiple phase-shifted clocks for the internal timing of the processor in a well-known manner. The program counter 33 is incremented one instruction count for every 4 master clock cycles and continues to increment until it reaches a count of 191, unless reset by an "End of Program" (EOP) instruction or reset signal. In its presently preferred embodiment, an instruction cycle takes 400 nsec., and thus the entire program of 192 words stored within the PROM 12 is executed at the rate of 13,020 Hz. The various lines associated with the timing are not shown in FIG. 1 in order not to complicate the figure.

As presently implemented, the processor includes (on the chip) an analog-to-digital and digital-to-analog converter. Input analog signals are coupled on input lines 18 to a multiplexer 21. This multiplexer, under commands from the PROM 12, selects predetermined signals for coupling to the sample-and-hold means 24. The signals sampled by the sample-and-hold means 24 are coupled to a comparator 29 and compared with signals provided at the output of the digital-to-analog converter 31 in an ordinary manner to provide an analog-to-digital conversion. The digital-to-analog converter employs words stored within the input/output register 16b for the comparison function during the analog-to-digital conversion. This conversion and the digital-to-analog conversion for the output is controlled by the PROM 12 and occurs while the processor is performing other functions. The output signals are coupled through the multiplexer 22 to selected output lines 19.

The specific digital-to-analog converter employed in the processor is described in U.S. Pat. No. 4,146,882. An MOS comparator circuit which may be employed for the comparator 29 of FIG. 1 is described in copending application Ser. No. 828,254, filed Aug. 27, 1977, entitled "MOS Analog-To-Digital Converter", assigned to the assignee of the present invention and subsequently abandoned in favor of a continuation application, Ser. No. 06/080,284, filed Oct. 1, 1979. The reference potential employed by the comparator 29 is externally generated. However, it may be generated "on-chip" using a reference voltage circuit such as shown in U.S. Pat. No. 4,100,437.

The digital portion of the processor generally comprises a random-access memory 16, a scaler 14, an arithmetic logic unit (ALU) 10 and a memory storage means (PROM 12) with its program counter 33. As presently implemented, this processor employs twos complement arithmetic.

In the presently preferred embodiment, the PROM 12 stores 192, 24-bit instructions. Each instruction consists of 6 fields. The first field of 3 bits is coupled by lines 43 to the ALU 10. In the ALU, these three bits are decoded and used to select the various operations performed by the ALU as will be described. A field of 4 bits is coupled by lines 44 to the scaler 14. The control signals on these lines are decoded by the scaler decoder 14w and used to control the scaler as will be described in greater detail. Two address fields, each of 6 bits, are transmitted via lines 45 and 46 to the decoding sections of the RAM 16. The signals on lines 46 are referred to as the "A-address" and are coupled to the A-decoder 51; the signals on the lines 45 are referred to as the "B-address" and are coupled to the B-decoder 52. As illustrated in FIG. 1, 4 lines of lines 46, shown as lines 47, are coupled to a constant register 16a which is part of the RAM 16. The last two fields (total of 5 bits) of each instruction word are coupled via lines 48 to the input/output means which primarily consists of the multiplexers 21 and 22, the sample-and-hold means 24, and of the analog-to-digital and digital-to-analog converters. The signals on these lines control the input/output functions in a well-known manner. However, during conditional arithmetic operations, these bits are used for ALU operations. For example, they select a single bit from register 16b for testing.

During the operation of the processor, the program counter 33 sequentially accesses each of the instructions. No program jumps are employed. As mentioned, the program returns to the first word upon completion of the 192nd word or for an EOP instruction which is contained in the input/output instruction field. The EOP instruction allows the program to be terminated at its useful end. As employed by the processor, the PROM 12 may be considered as a clock-controlled cycle generator which has a direct effect on the sample rate of the analog signals. If, by way of example, a given input is sampled once per program pass, the sample rate is 13,020 Hz. This provides an effective bandwidth of greater than 5 kHz, assuming an anti-aliasing filter is employed or no higher frequency components are present. The presently preferred embodiment for such a filter is disclosed in U.S. Pat. No. 4,168,440. The bandwidth of the processor is thus sufficiently broad for use in telephone line communications, and an application in that field will be discussed in conjunction with FIG. 4. Greater bandwidth may be obtained by sampling the input signal more frequently. This is done by using a shorter program with an EOP instruction or by repeating the program in the PROM.

As presently implemented, the PROM fetch/execute cycle is pipelined. That is, the next instruction is fetched while the previously fetched instruction is being executed. This substantially eliminates the PROM access time as a consideration in the processor speed.

The ALU 10 performs a number of well-known operations on the operands delivered via lines 35 and 37. The output data of the ALU 10 (lines 39) are written into the RAM 16. The operations performed by the ALU 10 are summarized in Table Ia and Ib below.

TABLE I

MEMORY- ALU INSTRUCTION OP-CODES a. Non-Conditional Arithmetic

| BIT PATTERN FROM PROM | | | MNEM | OPERATION* | DESCRIPTION/ COMMENTS |
|---|---|---|---|---|---|
| 0 | 0 | 0 | XOR | $B \oplus (A \times 2^k) \rightarrow B$ | |
| 0 | 0 | 1 | AND | $B \cdot (A \times 2^k) \rightarrow B$ | |
| 0 | 1 | 0 | LIM | $+1^{**} \rightarrow B$ if $A \geq 0$ | Sign of A saturates output |
| | | | | $-1 \rightarrow B$ if $A < 0$ | |
| 0 | 1 | 1 | ABS | $0 + \mid A \times 2^k \mid \rightarrow B$ | Absolute Value |
| 1 | 0 | 0 | ABA | $B + \mid A \times 2^k \mid \rightarrow B$ | Absolute Value and Add |
| 1 | 0 | 1 | SUB | $B - (A \times 2^k) \rightarrow B$ | |
| 1 | 1 | 0 | ADD | $B + (A \times 2^k) \rightarrow B$ | |
| 1 | 1 | 1 | LDA | $0 + (A \times 2^k) \rightarrow B$ | | b. Conditional Arithmetic Operations
ALU Functions made Conditional by codes on lines 48.

| ALU Function & Bit Pattern | Bit Tested | If Tested bit = 0 | If Tested bit = 1 |
|---|---|---|---|
| ADD (110) | DAR (n) | NO-OP(B→B) | ADD $(B+A \times 2^k \rightarrow B)$ |
| LDA(111) | DAR (n) | NO-OP(B→B) | LDA $(0+A \times 2^k \rightarrow B)$ |
| SUB (101) | PREV cy | ADD $(B+A \times 2^k \rightarrow B)$ cy→DAR (n) | SUB $(B-A \times 2^k \rightarrow B)$ cy →DAR (n) |

*Note - k is the value selected by the shift code, $-13 \leq k \leq +2$
**Note - the largest positive value $(1-2^{-24})$ is stored.

Note that DAR (n) represents a bit of the DAR (register 16b), as selected by the conditional operand in the control field on lines 48. For AND and LDA, the selected bit is tested. For SUB, the selected bit is altered by being set to the carry output of the highest order position of the ALU; and the conditional operation is based on a test of the carry resulting from the previous ALU operation.

Most of the operations set forth above are self-explanatory. The absolute value (ABS) and absolute add (ABA) convert the operand on lines 37 to an absolute value before performing any calculations. Load (LDA) and ABS are treated as arithmetic operations in the ALU. That is, the operand on lines 37 is added to zero which replaces the B-operand. This is necessary to avoid the detection of a left shift overflow condition which will be described below. Limit (LIM) sets the result to + or − the maximum value which may be stored in the 25-bit word lengths of the RAM 16 based on the sign of the A-operand.

The output of the ALU 10 (from the overflow tester 10a) is always a 25-bit result which is written into the RAM location determined by the B-address. This writing occurs towards the end of each of the instruction cycles. The two operands enter the ALU as 28-bit words. This 28-bit word length is used to accommodate the left shifting or scaling performed by the scaler 14. In the case of the operand on lines 35, the sign bit is copied onto the three remaining lines. Thus, if the sign bit is a binary one, the three lines which do not receive stored signals from the RAM couple binary ones to the ALU.

The scaler 14 is able to scale any A-operand to a magnitude between $2^2$ and $2^{-13}$. Therefore, with a 25 word input to the scaler, an overflow from a 28-bit result can never occur since the maximum shift to the left of the 25-bit word input is two places. However, the output of the ALU (input into tester 10a) may be larger than 25 bits, and thus may not be stored at a 25-bit word in the RAM 16. The overflow tester 10a determines when the result is too large to be stored as a 25-bit word. In this case, the result is corrected to the most positive or most negative twos complement number attainable in 25 bits. This number is then stored in the RAM 16. This "saturation" algorithm protects the continuity of the digitized analog signals and provides stability to the implemented signal processing functions. Note that typically in the prior art when an overflow occurs, a somewhat complex, time consuming procedure is required to handle the overflow. The algorithm is embodied in the execution cycle rate, thus no time is lost.

The overflow tester 10a is basically a multiplexer with related logic circuit. It receives the 28-bit extended variables from the ALU 10. The logic circuit compares the four most significant bits. If they are all the same (i.e., all ones or all zeros), the twos complement number from the ALU is moved into RAM 16 via lines 39 since the number will fit into 25 bits. (The three most significant bits are simply dropped.) If the four most significant bits are not the same, the multipler selects the largest positive or negative twos complement, 25-bit number which is then transferred into RAM 16. (These numbers are a one and 24 zeros or a zero and twenty-four ones.) For this case, the most significant bit of the 28-bit word indicates the sign of 25-bit word, and thus controls the selection of either the positive or negative number.

The scaler 14 is a digital shifting means which in the presently preferred embodiment, shifts the 25-bit word from the A-ports of the RAM 16 to any magnitude between $2^2$ and $2^{-13}$ (left 2, right 13), as mentioned. It is implemented with an MOS transmission gate matrix. The specific circuit technique used is disclosed in U.S. Pat. No. 4,031,379. The scaler decoder 14w has four input lines. This decoder decodes the 16 possible digital signals on the input lines (shown as "SHF" in Table II) to select one of 16 output lines. Thus, an ordinary decoding circuit is used (such as used for decoding memory addresses). The 16 line output of the decoder 14w controls the scaling within the scaler 14.

The operation of the scaler 14 is summarized in Table II.

TABLE II

| SHF | | | | MNEM | OPER-ATION | DESCRIPTION/ COMMENTS |
|---|---|---|---|---|---|---|
| 3 | 2 | 1 | 0 | | | |
| 1 | 1 | 1 | 0 | R13 | $A \times 2^{-13}$ | Right Shift 13 |
| 0 | 0 | 0 | 0 | R01 | $A \times 2^{-1}$ | Right Shift 1 |

TABLE II-continued

| SHF | | | | MNEM | OPER-ATION | DESCRIPTION/ COMMENTS |
|---|---|---|---|---|---|---|
| 1 | 1 | 1 | 0 | L01 | $A \times 2^1$ | Left Shift 1 |
| 1 | 1 | 0 | 1 | L02 | $A \times 2^2$ | Left Shift 2 |
| 1 | 1 | 1 | 1 | R00 | $A \times 2^0$ | No Shift |

The RAM 16, in the presently preferred embodiment, is a static memory organized as 40 words of 25 bits each. The A-address selects stored data for the A-ports (lines 25) and similarly, the B-address selects stored data for the B-ports (lines 28).

RAM 16 includes a constant register 16a which receives a 4-bit data word from the A-address field. The constant register makes available a set of fixed values which can be used to adjust bias levels, set thresholds, etc. In this 25-bit wide register, the four highest order bits are setable, the lower 21 bits are all zeros. The number in this register is accessed through the A-ports. The four data bits on lines 47 are placed into the four most significant bit positions of the register 16a with the remaining positions set to binary zeros. This is equivalent to a number between $(-8/8)$ to $(+7/8)$ before scaling.

The input/output register 16b is also part of the memory 16 and performs the interfacing function with the analog-to-digital and digital-to-analog converters. Each bit position of this register is selectable for processing through the ALU 10 for conditional arithmetic operations. This 9-bit wide register is accessible in a plurality of ways, (e.g., via direct write or read as a pseudo-RAM location, and via the input/output analog converting circuits.) The 9 most significant bits of the 25-bit words stored within the memory can be placed in this register via lines 41 from either the A-ports or the B-ports of RAM 16.

Figure 2:
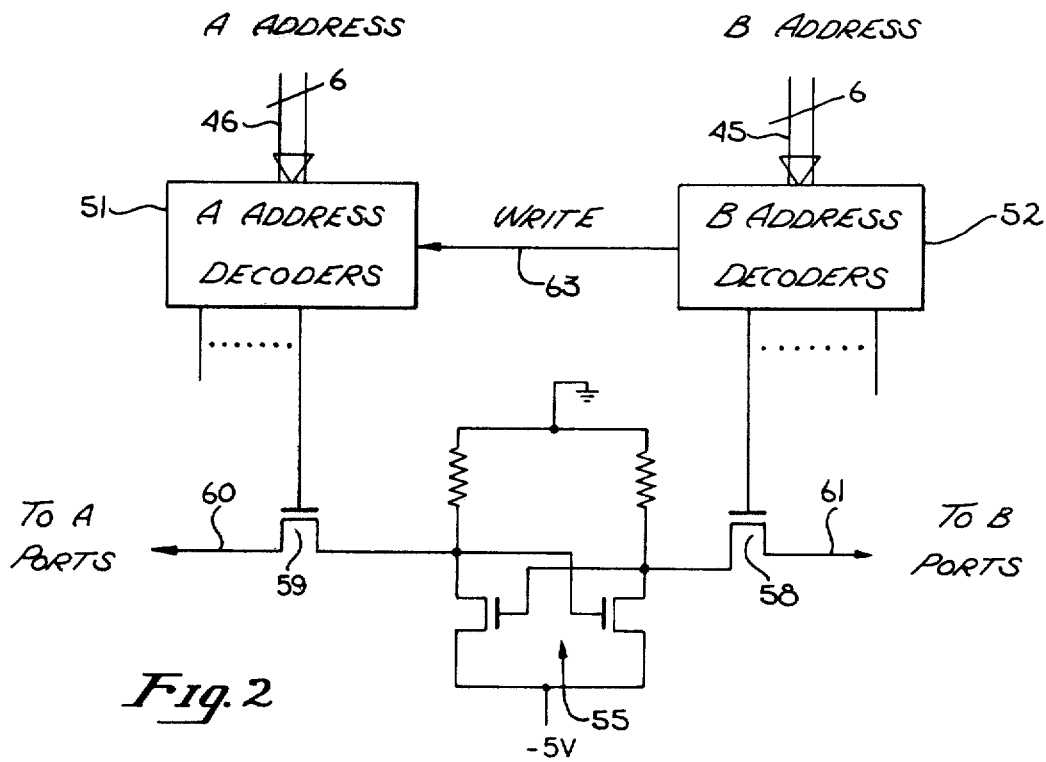
FIG. 2 is a partial circuit diagram of the random-access memory employed in the processor of FIG. 1.

Referring now to FIG. 2, a typical memory cell 55 employed within the RAM 16 of FIG. 1 is shown. This memory cell comprises a well-known bistable circuit. One output from this cell is coupled through transistor 58 to a line 61. The other output is coupled through a transistor 59 to a line 60. The gate of transistor 59 is coupled to the A-address decoder 51. Similarly, the gate of transistor 58 is coupled to the B-address decoder 52. When an address is received by the memory, the decoders 51 and 52 decode this address in ordinary manner and select the appropriate stored data which is then coupled to the A-ports and the B-ports. For example, if cell 55 is selected by both the A-address and the B-address, both transistors 59 and 58 are selected and the state of the memory cell 55 is coupled through lines 60 and 61 to the A-ports and B-ports, respectively. The memory includes logic which compensates for the fact that sensing of the bistable circuits is performed from the complementary outputs of these circuits. As mentioned towards the end of each instruction cycle, the B-address is employed to select the cells into which data from the ALU is written. For this purpose, the B-address effectively overrides the A-address; this is shown by the line 63 in FIG. 2.

It should be noted that the memory cells in the RAM may be simultaneously addressed for the A-ports and B-ports. This permits the furnishing of different operands from a single memory without two separate address cycles. A substantial amount of substrate area is saved by this technique in addition to a gain in speed.

All variables employed by the processor are fixed point values of 25 bits, using twos complement arithmetic. For purposes of explanation, it is convenient to assume that a binary point is present just right of the highest order bit (the sign bit). Then the range of any value of x can be considered as $-1.000 \ldots 0 < -X < +1.000 \ldots 0$. With this convention, the overflow tester 10a of FIG. 1 need only examine the most significant 4 bits of each 28-bit word to determine if an overflow (with respect to the 25-bit word lengths) has occurred. If all 4 most significant bits are the same, then the word may be shifted into the RAM 16 by ignoring the 3 most significant bits. On the other hand, if the 4 most significant bits are not the same, then the result is too large to fit within the allocated 25 bits. In this case, the result is replaced with a value which has the sign of the correct result (which is equivalent to the highest order bit of the 28-bit word), but has the largest magnitude, as mentioned.

Before describing a specific use for the processor of FIG. 1, a brief description of the manner in which the scaler and ALU cooperate is helpful. Assume it is necessary to multiply x by the coefficient 1.11100011. In a typical algorithm, the result is computed by employing six addition steps corresponding to each of the binary ones in the coefficient. However, the result y may be represented by:

$$Y = (x \cdot 2^1) - (x \cdot 2^{-3}) + (x \cdot 2^{-6}) - (x \cdot 2^{-8})$$

which requires four addition/subtraction operations. If x is communicated to the scaler 14 from the memory, the shifts of x by the magnitudes $2^1$, $2^{-3}$, $2^{-6}$, and $2^{-8}$ are easily performed by the scaler. After each shift, the appropriate addition or subtraction is performed by the ALU 10 to provide the result. In some cases, a combination of the above algorithm along with the more standard technique provides the most efficient way of reaching the result. For example, if a coefficient is 1.111010101, eight additions or subtractions would be required for the above-described method. However, the same result can be reached with five steps as shown by the following equation:

$$Y = (x \cdot 2^1) - (x \cdot 2^{-3}) + (x \cdot 2^{-5}) + (x \cdot 2^{-7}) + (x \cdot 2^{-9})$$

Assume now that the processor FIG. 1 is to be employed as filter and more specifically, a filter with a complex conjugate pair of poles at $$s = \pm j\omega_0$$

Figure 3:
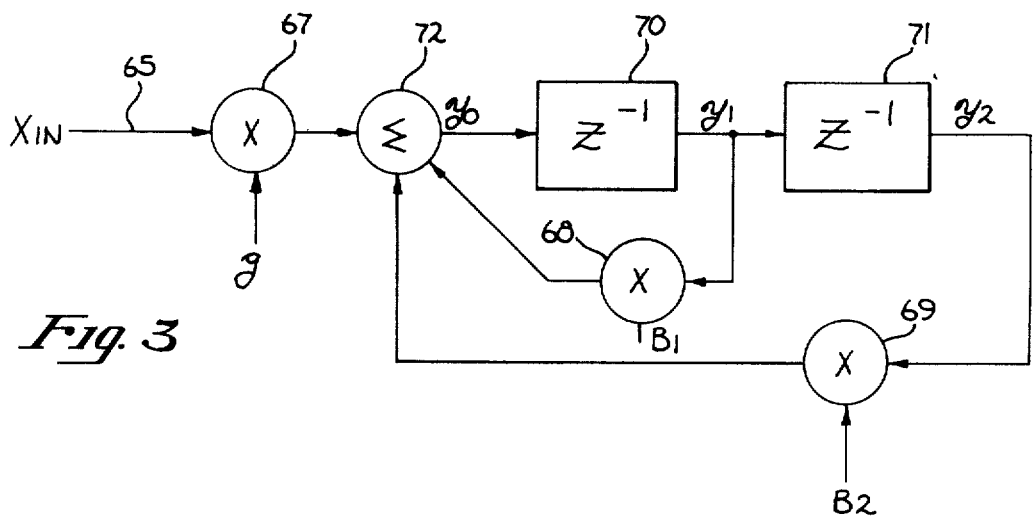
FIG. 3 is a block diagram of a well-known recursive filter. This diagram is used to describe the manner in which such a filter is implemented by the processor of FIG. 1.

It is well-known that the sample data equivalent of a "continuous" filter may be represented by one or more recursive filter sections such as the one shown in FIG. 3. For each sample, $y_1$ propogates to $y_2$, and $y_0$ to $y_1$. The new value for $y_0$ is represented by the equation:

$$y_0 = gx + B_1 y_1 + B_2 y_2$$

Thus for each sample, the input shown on line 65 is multiplied by the value g as shown by the multiplier 67 and is then communicated to the summer 72. The multiplier 68 multiplies $y_1$ and $B_1$ and communicates the result to the summer 72. Similarly, the multiplier 69 multiplies $y_2$ by the coefficient $B_2$ and the result is communicated to the summer 72. The blocks 70 and 71 represent the unit delays, more specifically, the rate at which the analog input signal is sampled by the sample-and-hold means 24 of FIG. 1. Each unit delay represents a sample rate propagation of the original signed, Xin, that is, Y1 is the value of summer 72 delayed, $T-1$ (where T is the sample period) and Y2, the value of the summer 72 delayed, $T-2$.

For the above example, $$B_1 = 2e^{-T\cos\omega_0 t}$$
$$\text{and } B_2 = -e^{-\sigma t}$$
$$\text{where } \sigma^t = \frac{\omega_0 t}{2Q}$$

Assume further that the filter is to have resonance at 1,000 Hz+0.5% with a Q between 75 and 100 and a midband gain of $1\pm 10\%$, for a sample rate of 76.8 microseconds. Then $\omega_0 t = 0.48255 \pm 0.0024$ and $0.002412 < \sigma t \leq 0.003217$ B2 in binary form is given by:

$$0.111111001011011 \leq -B_2 \leq 1111111011000100$$

A value which falls within this range and which only requires three terms to express is:

$$-B_2 = 0.111111101, \text{ that is, } -B_2 = 0.9941406$$

$B_1$ must fall within the range of:

$$1.764205 \leq B_1 \leq 1.768646$$

In binary form, this may be written as:

$$1.1100010011001 \geq B_1 \geq 1.110000111010$$

The value $B_1 = 1.110001$ meets this requirement. With these binary values for $B_1$ and $B_2$, $$f_0 = 1001.8 \text{ Hz and } Q = 82$$

The value for the coefficient g may be found by evaluating the midband gain of the filter. This relatively complex computation assumes that $Y_0 = \sin \omega t$. It can be shown that $$0.002452 \leq g \leq 0.00299$$

A binary value for g which falls within this range is:

$$g = 0.0000000011$$

To implement the above recursive filter in the processor of FIG. 1, consideration must be given first to the fact that both $B_1 Y_1$ and $B_2 Y_2$ may contribute to an immediate overflow. To handle this potential overflow, a fraction of $Y_0$, for example ($Y_0/4$) is used. Then $Y_0/4$) is shifted left when propagating $Y_0$ to $Y_1$ during the next pass. If overflow occurs, it will be when $Y_0$ is propagated to $Y_1$ rather than for some intermediate value. Table III below shows the asembly code for implementing this recursive filter in the processor of FIG. 1. The variable assigned for $Y_0$ is shown as $Y_{00}$ to note that it represents only one-fourth of the desired value.

TABLE III

| ALU Operation | Destination | Source | Shift by Scaler 14 |
|---|---|---|---|
| LDA | $Y_2$ | $Y_1$ | 0 |
| LDA | $Y_1$ | $Y_{00}$ | 2 |
| LDA | $Y_{00}$ | $Y_1$ | $-1$ |
| SUB | $Y_{00}$ | $Y_1$ | $-4$ |
| ADD | $Y_{00}$ | $Y_1$ | $-8$ |

TABLE III-continued

| ALU Operation | Destination | Source | Shift by Scaler 14 |
|---|---|---|---|
| SUB | $Y_{00}$ | $Y_2$ | $-2$ |
| ADD | $Y_{00}$ | $Y_2$ | $-9$ |
| SUB | $Y_{00}$ | $Y_2$ | $-11$ |
| ADD | $Y_{00}$ | x | $-10$ |
| SUB | $Y_{00}$ | x | $-12$ |

In understanding the above table, the additional shift of 2—2 must be considered, note (Y $_0$/4) is generated.

The filter thus takes 10 words of PROM to implement. The program uses 4 words of the RAM 16 for the variables $Y_{00}$, $Y_1$, $Y_2$, and x. However, it is possible that x and $Y_2$ be stored in temporary memory locations, in effect, 3 words.

In the above example, the blocks 70 and 71 of FIG. 3 represent the delay associated with the execution of the 192 instructions contained within the PROM. Where a faster sample rate (broader bandwidth) is required, the instructions implementing the filter, or the like, may be repeated within the PROM or an "EOP" instruction may be employed causing the instructions to be reexecuted more frequently, as mentioned.

In a similar manner to that used to implement the filter having complex conjugate pole pairs, complex conjugate zero pairs may be implemented. Moreover, in the presently preferred embodiment, four basic sources of non-linear operations are available, specifically, ABS, LIM, conditional arithmetic and the overflow algorithm. The use of the ABS and the overflow operations produce continuous functions while the LIM and conditional arithmetic provide discontinuous functions. The ABS operation is equivalent to an ideal full-wave rectifier. Rectification and filtering may be combined using the ABA operation for the filter input. Oscillators may be similarly implemented by the processor. One method utilizes a simple relaxation technique to implement a sawtooth waveform generator. The sawtooth waveform may then be altered using "piecewise" linear transforms to simulate a sinusoidal function. Another method consists of implementing an unstable second order filter with poles on the S plane jω axis or Z plane unit circle.

Figure 4:
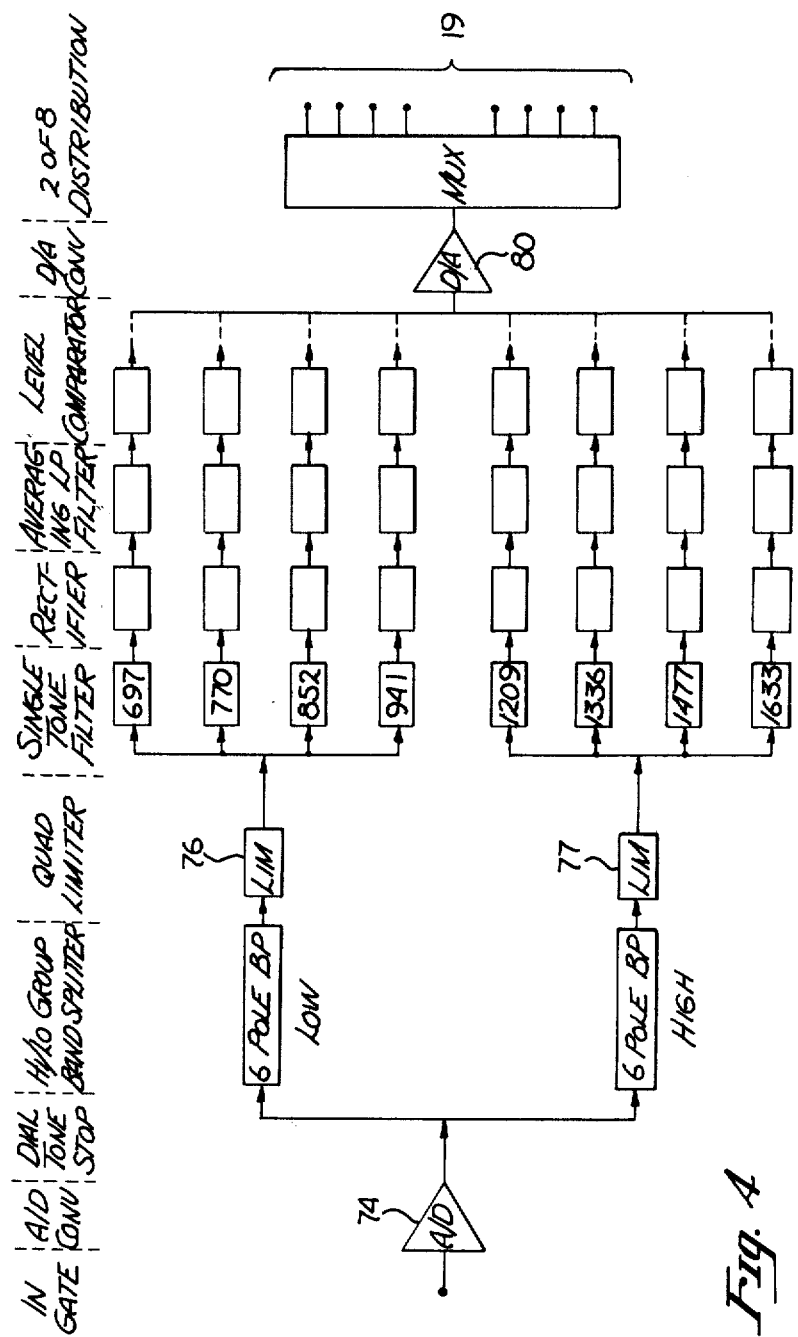
FIG. 4 illustrates the plurality of filtering operations which are performed by the processor of FIG. 1 with a single program.

A typical application for the processor of FIG. 1 is shown graphically in FIG. 4. In this application, a telephone line signal is examined to detect the 8 separate signal tones commonly used in a Touch-Tone dialing system. The high frequency components of the signal are first removed to prevent aliasing. The signal is then applied to the analog-to-digital converter 74 of FIG. 4. This function is performed by the analog section of the processor of FIG. 1. At the beginning of the 192 words of the instruction set, the PROM instructions implement a 6-pole, low bandpass filter and a 6-pole, high bandpass filter. Quadrature limiting is also implemented as shown by the blocks 76 and 77. Then the program implements 8 single tone filters ranging in frequency from 697 Hz to 1633 Hz. The program also implements rectification, averaging and level detection. The output is then converted to analog form as shown by digital-to-analog converter 80 and multiplexed on the 8 output lines 19. All the operations shown in FIG. 4, including the filtering, rectification, averaging, comparison and conversion may be performed within the confines of the 192 word program.

The resistive ladder network employed in the digital-to-analog converter 31 of FIG. 1 is coupled to a positive reference potential of approximately +2 volts. The output from the DAC 31 thus varies from 0 volts to +2 volts. The register 16b provides a sign bit to indicate whether the output number is positive or negative. This sign bit is not used by the DAC 31. To obtain both a positive and negative output, the circuit of FIG. 5 is used along with the sign bit. By using the circuit of FIG. 5, the sign information is not lost and importantly, the resistive ladder network requires only half the substrate area that would otherwise be required if the converter were required to develop both a positive and negative signal.

The circuit of FIG. 5 is coupled between the converter 31 and the multiplexer 22. The output of the converter, $V$DAC is coupled to line 89 while line 94, the output of the circuit, provides an input signal to the multiplexer 22.

The circuit includes an amplifier 92 which receives $V$DAC via the transistor 88 and capacitor 85 (C). This signal is coupled to the non-inverting input terminal (node 90) of the amplifier 92. Node 90 is selectively coupled to ground through the transistor 86. Node 95 is also selectively coupled to ground through the transistor 87. The output of the amplifier 92 is sampled through transistor 93. The parasitic capacitance associated with node 90 is shown as capacitor 91 ($C_p$). Transistors 86, 87, 88 and 93 receive timing signals $S_0$, $S_1$, $S_2$, and $S_3$, respectively, from the timing generator 95. The amplifier 92 is coupled between a potential of +5 volts and −5 volts, and the quiescent output from this amplifier is 0 volts.

The sign bit from the register 16b of FIG. 1 is used by the generator 95 to generate two sets of waveforms. If the sign bit indicates that the output is a positive output, then the signals of FIG. 6a are generated. On the other hand, if the sign bit indicates a negative output then the signals of FIG. 6b are generated. Ordinary timing circuits within generator 95 generate the waveforms of FIG. 6a and 6b.

Assume for purposes of discussion that a positive output is required on line 94 and that a positive analog signal ($V$DAC) is applied to line 89. During the period $T_1$ (FIG. 6a), the timing signals $S_0$ and $S_1$ are high thus transistors 86 and 87 conduct. This discharges nodes 90 and 95 to 0 volts. During the period $T_2$, since the signal $S_0$ dropped in potential, node 90 is allowed to float. In fact, node 90 charges to $-V_{os}$, the offset potential associated with the parasitic capacitive coupling between the gate of transistor 86 and node 90. This potential, however, is quite small. During the period $T_3$, neither transistors 86 nor 87 conduct, but rather $V$DAC is coupled to node 95 through the transistor 88. This positively charges node 90 to a potential of $-V_{os}+V$DAC $(C/C+C_p.)$ Since $C_p$ is relatively small when compared to C and since $V_{os}$ is small, node 90 is positively charged to approximately $V$DAC. During the period $T_4$ when transistor 93 conducts, this positive potential is then coupled to line 94.

Assume now that the sign bit indicates a negative output and once again a positive signal ($V$DAC) is applied on line 89. During the period $T_1$, both transistors 86 and 88 conduct (see FIG. 6b). This charges node 95 to $V$DAC while node 90 is held at ground potential. During the period $T_2$, transistor 86 ceases to conduct, bringing node 90 to the offset potential $-V_{os}$. Then during the period $T_3$, only transistor 87 conducts, discharging node 95, however, pulling node 92 to $-V_{os}$ $-V_{DAC}(C/C+C_p)$ or approximately $-V_{DAC}$. Note that the potential on node 90 is now negative, and when this potential is sampled on line 94 during $T_4$, the desired negative output is obtained.

Thus, a digital processor has been described which is particularly adaptable for implementing analog functions, such as filtering, rectification, etc. The processor employs a programmable memory and thus may be programmed and reprogrammed.

We claim:

1. A digital processor for processing input analog signals comprising:

an analog-to-digital converter for converting said input analog signals into an input digital signal;

an arithmetic logic unit (ALU) for performing digital arithmetic, having first and second input lines, and a set of output lines, and a set of ALU control lines;

a random-access memory having memory address lines, input lines and first and second output lines for storing digital data presented on said input lines, the data stored in the cells of said memory being simultaneously accessible at said first and said second output lines, said first output lines coupled to said first input lines of said ALU, said output lines of said ALU coupled to said input lines of said memory, said input lines of said memory also being coupled to said converter to receive said input digital signal;

a scaler means having scaler means control lines for shifting a digital signal presented on scaler input lines and presenting the shifted signal on scaler output lines, said scaler input lines coupled to said second output lines of said memory and said scaler output lines coupled to said second input lines of said ALU;

a program storage means for storing a digital control program, said storage means coupled to supply program instructions to said ALU control lines, addresses to said memory address lines, and bit patterns to said scaler means control lines to control said shifting;

whereby filtering and other functions are readily performed by said processor since said scaler means and ALU permit rapid multiplications by coefficients.

2. The processor defined by claim 1 wherin said storage means communicates a first and a second address field to said memory for selecting stored data for coupling to said first and second output lines, respectively.

3. The processor defined by claim 2 wherein said first address field determines the location in said memory into which data is written.

4. The processor defined by claim 3 wherein said memory includes a register for storing a constant, said constant being coupled to said register from said second address field.

5. The processor defined by claim 1 wherein said memory stores words of n-bits and where said ALU performs said digital arithmetic on words of greater than n-bits.

6. The processor defined by claim 5 including detecting means coupled to said ALU, said detecting means being responsive to the digital signal resulting from said digital arithmetic performed by said ALU for detecting words of effective width greater than n-bits, and for substituting a predetermined word of n-bits for said words of effective width greater than n-bits in response thereto, and coupling said predetermined word to said input lines of said memory.

7. The processor defined by claim 6 wherein said scaler means shifts words in both directions.

8. A digital processor for processing analog signals comprising:

a program storage means for storing a digital program;

input means for receiving said input analog signal to said processor and for converting said signal to an input digital signal;

a random-access memory coupled to said storage means for receiving address signals from said storage means and coupled to said input means for receiving and storing said input digital signals; said memory for storing digital words of n-bits in length;

an arithmetic logic unit (ALU) coupled to said program storage means for receiving ALU control signals and for performing digital arithmetic, said ALU coupled to receive a first signal representing a first operand from said memory, to receive a second signal representing a second operand and to provide an output signal for storage in said memory;

a scaler means for shifting a digital signal, said scaler means being coupled to said program storage means for receiving scaler means control signals, and coupled to receive signals from said memory and coupled to said ALU to provide said second signal representing said second operand, said ALU for performing said digital arithmetic on said first and second operand greater in length than said n-bits, and coupling results having a length not exceeding n-bits to said memory, said ALU having means coupled thereto for detecting words resulting from said digital arithmetic with effective lengths greater than said n-bits, and for coupling predetermined words of n-bits in length to said memory upon said detection;

whereby special processing of words greater in length than said n-bits is greatly reduced thereby providing more rapid processing of signals.

9. The processor defined by claim 8 wherein said scaler means can shift n-bit signals in either direction.

10. The process defined by claim 9 wherein said scaler means receives said n-bit signals and provides signals of width greater than said n-bits to said ALU.

11. The processor defined by claim 10 wherein said processor operates with twos complement arithmetic.

12. The processor defined by claim 8 wherein said memory includes two output ports, one coupled to said ALU and the other to said scaler means.

13. The processor defined by claim 12 wherein said storage means couples two address fields to said memory, one for selecting data for said one port, and the other for selecting data for said other port.

14. The processor defined by claim 13 wherein one of said two address fields determines the location into which the data from said ALU is written.

* * * * *

UNITED STATES PATENT AND TRADEMARK OFFICE
CERTIFICATE OF CORRECTION

PATENT NO. : 4,319,325
DATED : March 9, 1982
INVENTOR(S) : Hoff, Jr. et al.

It is certified that error appears in the above-identified patent and that said Letters Patent is hereby corrected as shown below:

| COLUMN | LINE | DESCRIPTION |
| --- | --- | --- |
| 4 | 51 | Delete "AND" and insert in lieu thereof --ADD--. |
| 8 | 17 | Delete "$0.002412 < \sigma t \leq 0.003217$" and insert in lieu thereof --$0.002412 \leq \sigma t \leq 0.003217$--. |

Signed and Sealed this

Twenty-fourth Day of December 1985

[SEAL]

Attest:

DONALD J. QUIGG

Attesting Officer

Commissioner of Patents and Trademarks